(12) United States Patent
Okano et al.

(10) Patent No.: US 10,877,492 B2
(45) Date of Patent: Dec. 29, 2020

(54) FLOW PATH FORMING STRUCTURE, FLOW RATE MEASURING DEVICE AND FLOW RATE CONTROL DEVICE

(71) Applicant: HORIBA STEC, Co., Ltd., Kyoto (JP)

(72) Inventors: Hiroyuki Okano, Kyoto (JP); Atsushi Ieki, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 0 days.

(21) Appl. No.: 15/819,997

(22) Filed: Nov. 21, 2017

(65) Prior Publication Data

US 2018/0150088 A1    May 31, 2018

(30) Foreign Application Priority Data

Nov. 25, 2016    (JP) .................................. 2016-228662

(51) Int. Cl.
  *F16K 37/00* (2006.01)
  *G05D 7/06* (2006.01)
  (Continued)

(52) U.S. Cl.
  CPC ............. *G05D 7/0635* (2013.01); *F16K 1/12* (2013.01); *F16K 7/126* (2013.01); *F16K 31/004* (2013.01);
  (Continued)

(58) Field of Classification Search
  CPC ....... G05D 7/0635; F16K 1/12; F16K 37/005; F16K 7/126; F16K 31/004; G01F 1/69;
  (Continued)

(56) References Cited

U.S. PATENT DOCUMENTS

| 4,244,212 A | 1/1981 | Stignani |
| 4,312,234 A | 1/1982 | Rhodes et al. |

(Continued)

FOREIGN PATENT DOCUMENTS

| JP | 03193128 A | | 8/1991 |
| JP | 403193128 | * | 8/1991 |
| JP | H04110617 A | | 4/1992 |
| JP | 05025320 U | | 4/1993 |
| JP | 06018306 A | | 1/1994 |
| JP | 2001304928 A | | 10/2001 |
| JP | 2001327958 A | | 11/2001 |
| JP | 2009192220 A | | 8/2009 |

OTHER PUBLICATIONS

Japan Patent Office, Office Action Issued in Application No. 2016228662, dated Aug. 21, 2020, 8 pages.

*Primary Examiner* — Robert R Raevis
(74) *Attorney, Agent, or Firm* — Alleman Hall Creasman & Tuttle LLP (57) ABSTRACT

In a flow path forming structure, axial runout of a shaft relative to a central axis generated when the shaft is inserted into the flow path is suppressed. This structure includes a flow path along which a fluid passes, and a shaft body that is inserted into the flow path. An upstream side of the shaft body and an inner circumferential surface of the flow path have a plurality of contact positions at different phases, and a downstream side of the shaft body and an inner circumferential surface of the flow path have a plurality of contact positions at different phases. The fluid flows through gaps between the shaft body and the inner circumferential surface. The contact positions on one of the upstream and downstream sides are at different phases from all of the contact positions on the other one of the upstream and downstream sides.

9 Claims, 7 Drawing Sheets

(51) Int. Cl.
*F16K 31/00* (2006.01)
*G01F 1/684* (2006.01)
*F16K 7/12* (2006.01)
*G01F 1/40* (2006.01)
*F16K 1/12* (2006.01)
*G01F 1/69* (2006.01)
*G01F 15/00* (2006.01)
*G01F 5/00* (2006.01)
*G01F 1/696* (2006.01)

(52) U.S. Cl.
CPC .............. *F16K 37/005* (2013.01); *G01F 1/40* (2013.01); *G01F 1/6842* (2013.01); *G01F 1/6847* (2013.01); *G01F 1/69* (2013.01); *G01F 1/696* (2013.01); *G01F 5/00* (2013.01); *G01F 15/00* (2013.01)

(58) Field of Classification Search
CPC ........ G01F 1/40; G01F 1/6842; G01F 1/6847; G01F 7/05; G01F 1/696; G01F 5/00; G01F 5/005; G01F 15/00

USPC .. 73/861.61, 272 R, 861.71, 861.52–861.59, 73/861.58; 248/554, 555; 138/40
See application file for complete search history.

(56) References Cited

U.S. PATENT DOCUMENTS

| | | | |
|---|---|---|---|
| 4,886,086 A * | 12/1989 | Etchells | B05B 9/0403 |
| | | | 137/1 |
| 5,409,184 A * | 4/1995 | Udall | B64D 27/12 |
| | | | 244/54 |
| 5,445,035 A | 8/1995 | Delajoud | |
| 5,861,546 A * | 1/1999 | Sagi | G01F 1/44 |
| | | | 137/599.13 |
| 6,176,702 B1 * | 1/2001 | Mohr | C03B 5/235 |
| | | | 239/587.1 |
| 6,539,813 B1 | 4/2003 | Horiuchi et al. | |
| 8,979,491 B2 * | 3/2015 | Heyerman | B64D 27/20 |
| | | | 248/554 |
| 10,203,233 B2 * | 2/2019 | Zhang | G01F 1/40 |
| 2009/0084448 A1 | 4/2009 | Lowery | |
| 2015/0059498 A1 * | 3/2015 | Di Lullo | F16L 55/38 |
| | | | 73/865.8 |
| 2016/0138582 A1 | 5/2016 | Locke et al. | |

* cited by examiner

FLOW PATH FORMING STRUCTURE, FLOW RATE MEASURING DEVICE AND FLOW RATE CONTROL DEVICE

TECHNICAL FIELD

The present invention relates to a flow path forming structure, and to a flow rate measurement device and a flow rate control device that are equipped with this flow path forming structure.

TECHNICAL BACKGROUND

As a conventional flow path forming structure, a structure is disclosed in Patent document 1 that is equipped with a flow path along which a fluid passes, and a shaft body that is inserted into the flow path, and in which an upstream side and a downstream side of a tapered shaft body that is provided partway along the shaft body are brought into contact with an inner circumferential surface of the flow path, and the fluid is made to flow through a gap formed between the flow path and the shaft body.

However, in the above-described flow path forming structure, axial runout occurs when the shaft body is inserted into the flow path, and this axial runout may cause problems to occur in individual product items such as linearity impairment and irregularities being generated in the differential pressure flow rate characteristics of the flow path formed between the upstream side of the shaft body and the inner circumferential surface of the flow path, and the flow path formed between the tapered shaft body of the shaft body and the inner circumferential surface of the flow path.

DOCUMENTS OF THE PRIOR ART

Patent Documents

Patent Document 1
Japanese Unexamined Patent Application (JP-A) No. 4-110617

DISCLOSURE OF THE INVENTION

Problems to be Solved by the Invention

It is, therefore, a principal object of the present invention to suppress axial runout of a shaft body relative to a central axis of a flow path that occurs in a flow path forming structure when the shaft body is inserted into the flow path.

Means for Solving the Problem

Namely, a flow path forming structure of the present invention is characterized in being equipped with a flow path along which a fluid passes, and a shaft body that is inserted into the flow path, and is also characterized in that an upstream side of the shaft body and an inner circumferential surface of the flow path are in contact with each other at a plurality of contact positions having different phases, and a downstream side of the shaft body and an inner circumferential surface of the flow path are in contact with each other at a plurality of contact positions having different phases, and the fluid flows through gaps between the shaft body and the inner circumferential surface of the flow path, and is further characterized in that the contact positions on one of the upstream side and the downstream side are at different phases from all of the contact positions on the other one of the upstream side and the downstream side.

According to this structure, one side out of the upstream side and the downstream side of the shaft body is in contact with the inner circumferential surface of the flow path at a predetermined phase, while the other side out of the upstream side and the downstream side of the shaft body is not in contact with the inner circumferential surface of the flow path at a predetermined phase. As a result, axial runout towards a predetermined phase side of the shaft body relative to the central axis of the flow path, which is generated in the aforementioned other side that is not in contact with the inner circumferential surface of the flow path at a predetermined phase, is corrected in the aforementioned one side that is in contact with the inner circumferential surface of the flow path at a predetermined phase, so that axial runout of the shaft body relative to the central axis of the flow path is suppressed. Accordingly, axial runout that occurs when the shaft body is inserted into the flow path is reduced, and the ability to reproduce the gap that is formed between the shaft body and the inner circumferential surface in each individual product is improved. Moreover, linearity is not impaired and irregularities are reduced in the differential pressure flow rate characteristics of each product.

In the above-described flow path forming structure, it is also possible for the contact positions on either one of or on both of the upstream side and the downstream side to be at the same phase intervals.

If this type of structure is employed, then as a result of the respective contact positions being at the same phase intervals, uneven stress on the shaft body generated by the respective contact positions is eliminated, and any axial runout of the shaft body relative to the central axis of the flow path can be suppressed even further.

In the above-described flow path forming structure, it is also possible for the number of contact positions on the upstream side to be the same as the number of contact positions on the downstream side, and for the phase interval of the contact positions on the upstream side to be the same as the phase interval of the contact positions on the downstream side, and for the phase of the contact positions on the upstream side to be offset from the phase of the contact positions on the downstream side by one half of the phase interval.

If this type of structure is employed, then because the number of contact positions on the upstream side is the same as the number of contact positions on the downstream side, and the phase interval of the contact positions on the upstream side is the same as the phase interval of the contact positions on the downstream side, any axial runout towards the non-contact phase side relative to the central axis of the flow path that is generated in the non-contact phase, which is on the side out of the upstream side and the downstream side of the shaft body where there are no contact positions, is corrected by the contact between the shaft body and the inner circumferential surface of the flow path at the two contact positions on the other side that are located in the phase adjacent to this non-contact phase, and this non-contact phase is positioned in a center phase located in the middle of these two contact positions on the other side, so that any axial runout of the shaft body relative to the central axis of the flow path is suppressed even further.

In any of the above-described flow path forming structures, it is also possible for either the upstream side of the shaft body and the inner circumferential surface of the flow path, or the downstream side of the shaft body and the inner circumferential surface of the flow path, or else for both of the upstream side of the shaft body and the inner circumferential surface of the flow path, and the downstream side of the shaft body and the inner circumferential surface of the flow path to be in contact with each other via spacers that are provided at contact positions either on the shaft body or on the inner circumferential surface of the flow path. Moreover, it is also possible for either one of or both of the upstream side and the downstream side of the shaft body to be formed in a column shape having a corner in each contact position, and for each of the corners to be in contact with the inner circumferential surface of the flow path. If the latter structure is employed, then workability of the shaft body is improved. Furthermore, if a structure is employed in which either one of or both of the upstream side and the downstream side of the shaft body is formed in an angular column shape having a corner in each contact position, then workability of the shaft body is improved even further.

Moreover, a flow rate measuring device of the present invention is characterized in being equipped with any of the above-described flow path forming structures, and in being further provided with a flow rate measuring flow path that is connected in parallel to the flow path, and a flow rate sensor that is disposed on the flow rate measuring flow path.

A flow rate control device of the present invention is characterized in being equipped with any of the above-described flow path forming structures, and in being further provided with a flow rate measuring flow path that is connected in parallel to the flow path, a flow rate sensor that is disposed on the flow rate measuring flow path, and a flow rate control mechanism that is disposed on the flow path on the downstream side of a merging point where the flow path merges with the flow rate measuring flow path, and controls a flow rate of the fluid flowing through the flow path based on a flow rate measured by the flow rate sensor.

Effects of the Invention

According to the present invention which has the above-described structure, axial runout of a shaft body relative to a central axis of a flow path is suppressed when the shaft body is inserted into the flow path, and the ability to reproduce the flow path formed in the gap between the flow path and the shaft body is improved. Moreover, the linearity of the differential pressure flow rate characteristics is not impaired, and any irregularities therein are suppressed. As a result, accuracy is improved when a product is being assembled.

BEST EMBODIMENTS FOR IMPLEMENTING THE INVENTION

Hereinafter, a flow rate control device provided with a flow path forming structure according to the present invention will be described based on the drawings.

Figure 1:
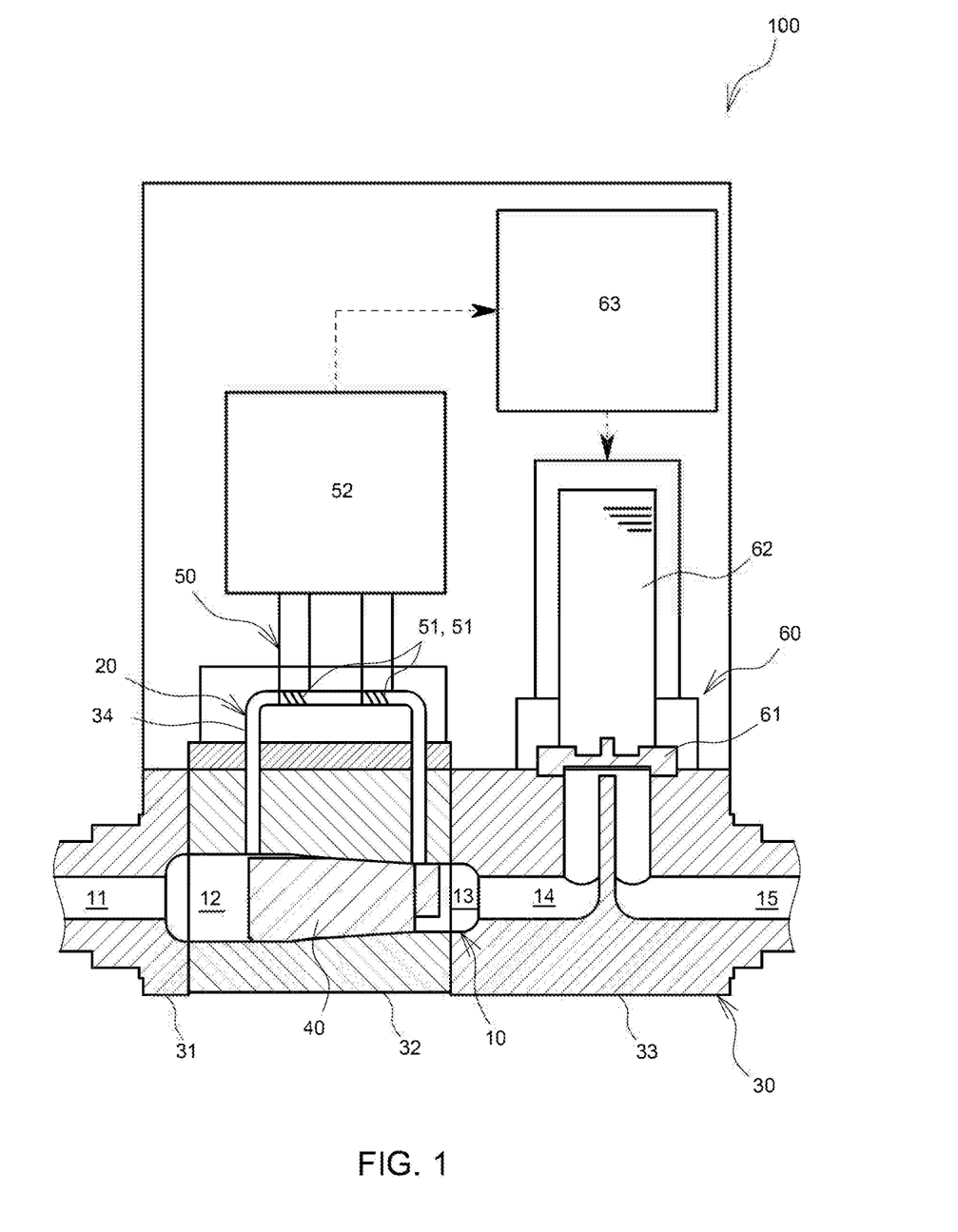
FIG. 1 is a schematic cross-sectional view schematically showing the structure of a flow rate control device according to a first embodiment.

As is shown in FIG. 1, a flow rate control device 100 of the present embodiment is formed having a main body 30 that is provided with a main flow path 10 through one end of which a fluid body is introduced and is then guided to another end thereof, and a flow rate measuring flow path 20 that is connected in parallel to the main flow path 10, a shaft body 40 that is inserted partway into the main flow path 10, a flow rate sensor 50 that is disposed on the flow rate measuring flow path 20, and a flow rate control valve 60 (i.e., a flow rate control mechanism) that is disposed on the downstream side of the shaft body 40 of the main flow path 10. Note that the main body 30 is divided into a plurality of block bodies 31, 32, and 33, and the main flow paths 10 and 20 are formed by connecting together these block bodies 31, 32, and 33. A part of the flow rate measuring flow path 20 is formed by a capillary tube 34 that is connected to the block 32. Note that the main flow path 10 corresponds to the flow path of the Claims.

The main flow path 10 is provided with an intake aperture 11 that is used to introduce a fluid from outside the main body 30 into the main flow path 10, a splitting flow path 12 that extends on the downstream side from the intake aperture 11 and to which the flow rate measuring flow path 20 is connected, a bypass flow path 13 that extends on the downstream side of the splitting flow path 12 and into which the shaft body 40 is inserted, a flow rate control flow path 14 that extends on the downstream side from the bypass flow path 13, and a discharge aperture 15 that extends on the downstream side from the flow rate control flow path 14 and is used to discharge a fluid to the outside of the main body 30.

Figure 2:
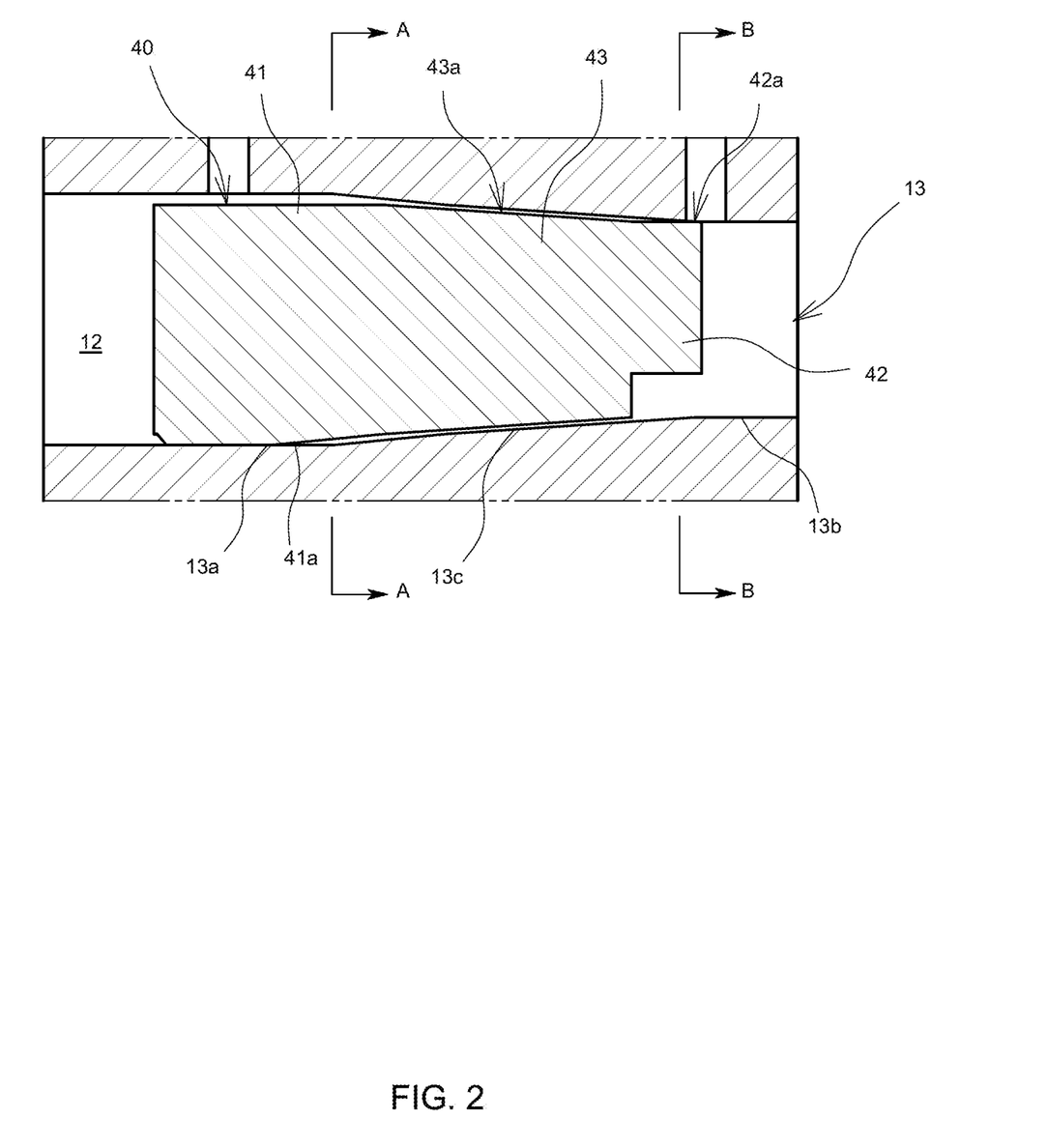
FIG. 2 is a cross-sectional view showing a state in which a shaft body according to the first embodiment has been inserted into a bypass flow path.

As is shown in FIG. 2, the bypass flow path 13 has an upstream-side flow path 13a that communicates with the splitting flow path 12, a downstream-side flow path 13b that communicates with the flow rate control flow path 14, and a flow rate regulating flow path 13c that connects the upstream-side flow path 13a to the downstream-side flow path 13b. Note that the upstream-side flow path 13a is shaped such that the upstream side thereof has a uniform diameter, while the downstream side thereof is tapered so as to gradually reduce in diameter approaching the flow rate regulating flow path 13c. The downstream-side flow path 13b has a uniform diameter, and an inner diameter thereof is smaller than an inner diameter of the downstream end of the upstream-side flow path 13a. The flow rate regulating flow path 13c is formed such that it continues on from the downstream end of the upstream-side flow path 13a in a tapered shape that gradually reduces in diameter approaching the upstream end of the downstream-side flow path 13b.

The shaft body 40 has an upstream-side shaft body 41 that is positioned within the upstream-side flow path 13a of the bypass flow path 13, a downstream-side shaft body 42 that is positioned within the downstream-side flow path 13b of the bypass flow path 13, and a flow path regulating shaft body 43 that is positioned within the flow rate regulating flow path 13c of the bypass flow path 13 and joins the upstream-side shaft body 41 and the downstream-side shaft body 42 together.

Figure 3:
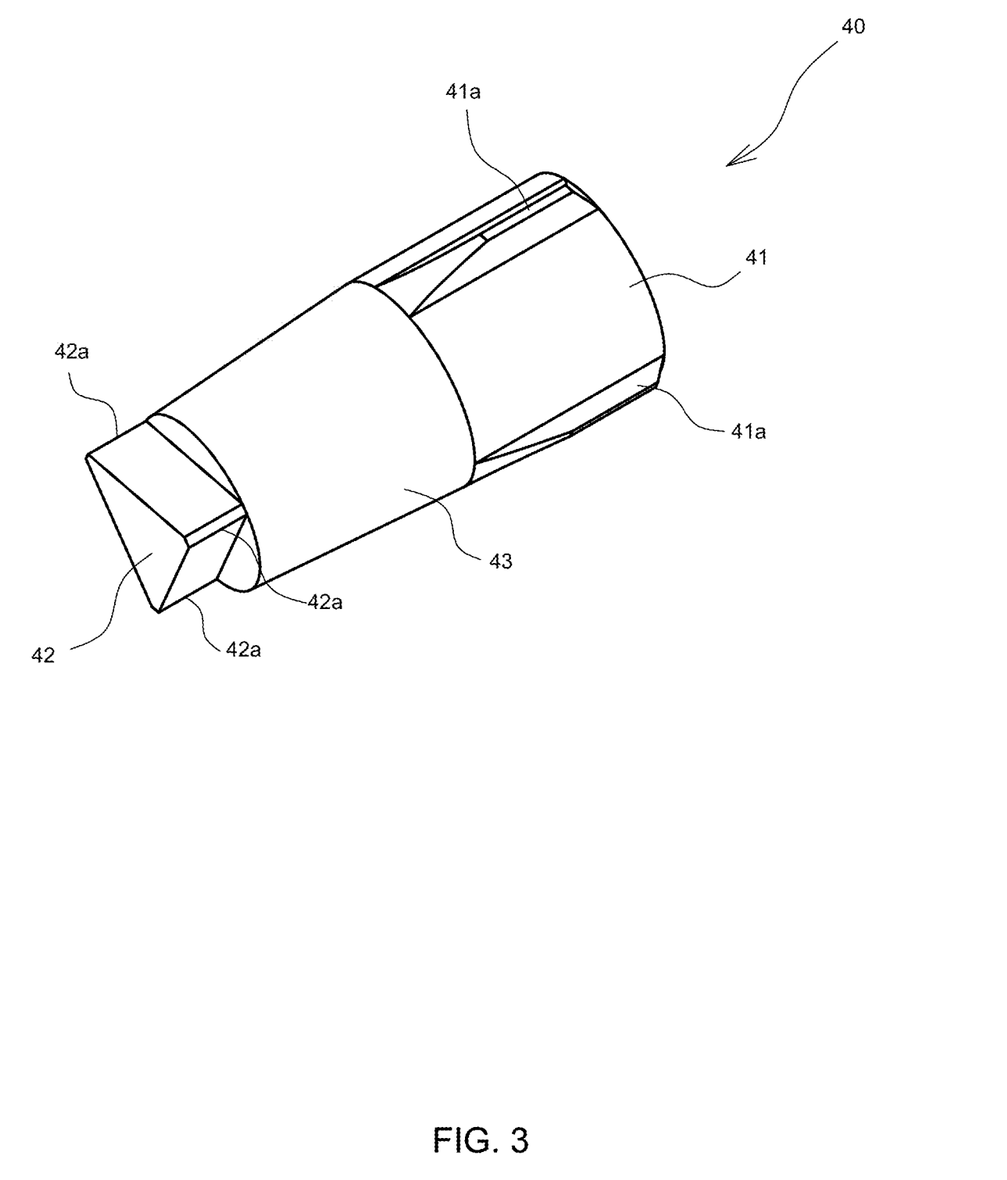
FIG. 3 is a perspective view showing the shaft body according to the first embodiment.
Figure 4A:
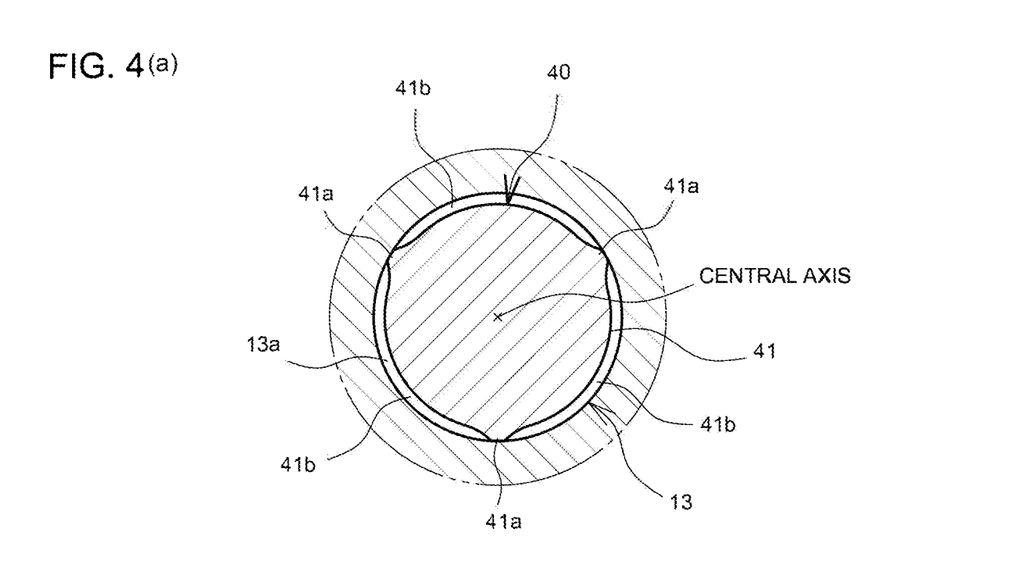
FIGS. 4(a) and 4(b) show cross-sectional views as seen from an axial direction showing states in which the shaft body according to the first embodiment has been inserted into the bypass flow path.

The upstream-side shaft body 41 is formed in a circular column shape whose outer diameter is smaller than the inner diameter of the upstream-side flow path 13a and, as is shown in FIG. 3 and in FIG. 4(a), which shows a cross-section taken along a line A-A in FIG. 2, has three spacers 41a . . . that are disposed at 120 degree intervals around an outer circumferential surface of the upstream-side shaft body 41, and that extend along the central axis of the shaft body 40. Namely, the three spacers 41a . . . are disposed at equidistant intervals in the circumferential direction of the shaft body 40. Note that distal end surfaces of the respective spacers 41a are disposed concentrically around a circle whose diameter is substantially the same as the inner diameter of the upstream-side flow path 13a. These distal end surfaces of the respective spacers 41a are formed as arc-shaped surfaces that extend along an inner circumferential surface of the upstream-side flow path 13a so as to be in surface contact with this inner circumferential surface. Accordingly, the upstream-side shaft body 41 is in contact with the inner circumferential surface of the upstream-side flow path 13a in three positions having mutually different phases. Moreover, the spacers 41a are all formed having the same shape, and they extend from the upstream end of the upstream-side shaft body 41 to the downstream end thereof. The height of the upstream side of the respective spacers 41a relative to the outer circumferential surface of the upstream-side shaft body 41 continues at the same height, while the height of the downstream side of the respective spacers 41a relative to the outer circumferential surface of the upstream-side shaft body 41 becomes gradually lower approaching the downstream end. As a result, the downstream side of the respective spacers 41a slopes so as to follow the downstream side of the upstream-side flow path 13a which is formed in a tapered shape. Moreover, the portions of the respective spacers 41a (i.e., the upstream side thereof) that are in contact with the inner circumferential surface of the upstream-side flow path 13a are arranged in parallel with each other such that the upstream end and the downstream end of each one match each other in the circumferential direction.

The downstream-side shaft body 42 is formed in a triangular column shape extending from the upstream end to the downstream end thereof. As is shown in FIG. 3 and in FIG. 4(b), which shows a cross-section taken along a line B-B in FIG. 2, three corners 42a . . . are disposed at 120 degree intervals so as to face towards an inner circumferential surface of the downstream-side flow path 13b. Namely, the three corners 42a . . . are disposed at equidistant intervals in the circumferential direction of the shaft body 40. Accordingly, the downstream-side shaft body 42 is in contact with the downstream-side flow path 13b at three mutually different phases. Note that distal end surfaces of the respective corners 42a are disposed concentrically around a circle whose diameter is the same as the inner diameter of the downstream-side flow path 13b. These distal end surfaces of the respective corners 42a are formed as arc-shaped surfaces that extend along an inner circumferential surface of the downstream-side flow path 13b so as to be in surface contact with this inner circumferential surface.

As is shown in FIG. 2, an upstream end of the flow path regulating shaft body 43 has substantially the same inner diameter as the inner diameter of the downstream end of the upstream-side flow path 13a, while a downstream end of the flow path regulating shaft body 43 has substantially the same inner diameter as the inner diameter of the downstream-side flow path 13b. Moreover, the flow path regulating shaft body 43 is formed in a tapered shape whose diameter becomes gradually narrower moving from the upstream end towards the downstream end thereof.

In addition, the phase of the contact positions where the upstream-side shaft body 41 is in contact with the inner circumferential surface of the upstream-side flow path 13a is offset from the phase of the contact positions where the downstream-side shaft body 42 is in contact with the inner circumferential surface of the downstream-side flow path 13b by 60 degrees, in other words, by half the phase interval (i.e., 120 degrees) between the contact positions of the upstream-side shaft body 41 and the contact positions of the downstream-side shaft body 42. Moreover, the shaft body 40 has plane symmetry relative to a plane extending from the central axis thereof to the contact positions of either the upstream-side shaft body 41 or the downstream-side shaft body 42. Note that a phase refers to a rotation angle in the circumferential direction of the shaft body 40 around the central axis (shown by an x in FIGS. 4(a) and 4(b)) of the shaft body 40. In addition, a phase interval refers to a rotation angle between mutually adjacent contact positions.

Figure 4B:
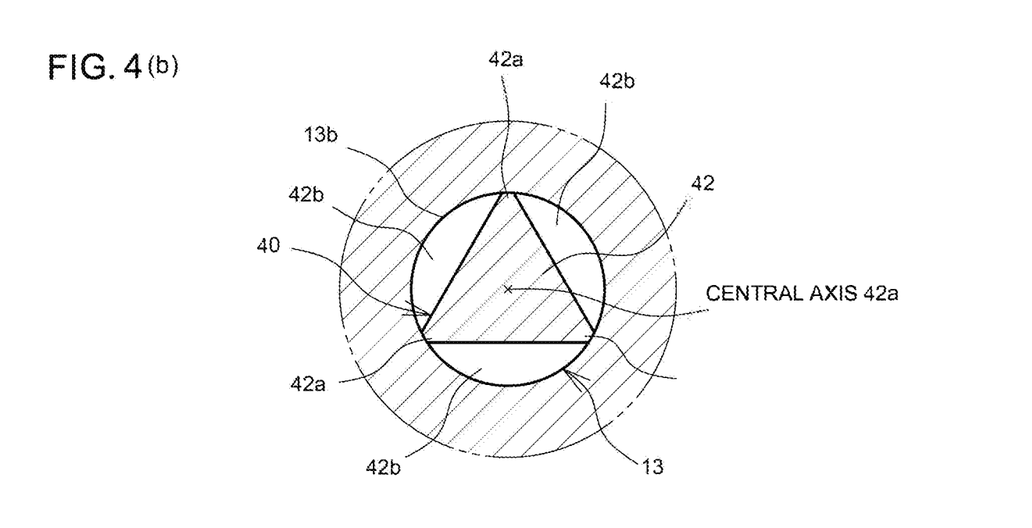

The upstream-side shaft body 41 and the inner circumferential surface of the upstream-side flow path 13a are structured such that the spacers 41a . . . that are provided at three positions at different phases on the circumferential surface of the upstream-side shaft body 41 are in contact with the inner circumferential surface of the upstream-side flow path 13a. As a result of this, as is shown in FIG. 4(a), three gaps 41b . . . having arc-shaped cross-sections that are delimited by the spacers 41a . . . are formed between the upstream-side shaft body 41 and the inner circumferential surface of the upstream-side flow path 13a, and these gaps 41b . . . form flow paths for a fluid. Furthermore, the downstream-side shaft body 42 and the inner circumferential surface of the downstream-side flow path 13b are structured such that the corners 42a . . . that are formed at three positions at different phases on the downstream-side shaft body 42 are in contact with the inner circumferential surface of the downstream-side flow path 13b. As a result of this, as is shown in FIG. 4(b), three gaps 42b having bow-shaped cross-sections that are delimited by the corners 42a . . . are formed between the downstream-side shaft body 42 and the inner circumferential surface of the downstream-side flow path 13b, and these gaps 42b . . . form flow paths for a fluid.

As is shown in FIG. 1, the flow rate measuring flow path 20 is structured such that an upstream-side part thereof that is connected to the splitting flow path 12 and a downstream-side part thereof that is connected to the downstream-side flow path 13b of the bypass flow path 13 are formed in the block body 32 that forms part of the main body 30, and this upstream-side part and downstream-side part are joined together by the capillary tube 34 that is connected to the block body 32. In addition, the flow rate sensor 50 that is used to measure the flow rate of a fluid flowing through the interior of the flow rate measuring flow path 20 is installed on the capillary tube 34.

The flow rate sensor 50 is a thermal mass flow rate sensor and has a pair of heat resistance wires 51 and 51 that are wound around the capillary tube 34, and a calculating unit 52 that calculates the mass flow rate of a fluid flowing through the flow rate measuring flow path 20 based on temperature differences generated in the pair of heat resistance wires 51 and 51. The calculating unit 52 uses a bridge circuit to convert a temperature difference generated when the pair of heat resistance wires 51 and 51 that are heated by being supplied with current are cooled by a fluid flowing through the capillary tube 34 into an electrical signal, and then calculates the mass flow rate of the fluid flowing through the flow rate measuring flow path 20 based on this electrical signal.

A part of the flow rate control flow path 14 is exposed from the block body 33, and the flow rate control valve 60 is installed on this part. The flow rate control valve 60 is installed so as to cover the location where the flow rate control flow path 14 is exposed, and is provided with a diaphragm 61 that controls the aperture angle of the flow rate control flow path 14, a piezo actuator 62 that drives the diaphragm 61, and a valve control unit 63 that controls the driving of the piezo actuator 62. Note that the valve control unit 63 has what is commonly known as a computer which is provided with a CPU, memory, an A/D-D/A converter, and input and output devices and the like, and the above-described various functions are performed by the respective devices operating in mutual cooperation as a result of a program stored in the aforementioned memory being executed. Specifically, the valve control unit 63 performs the functions of calculating a differential signal by comparing the electrical signal transmitted from the calculating unit 52 of the flow rate sensor 50 that resulted from the conversion of the temperature differences obtained from the pair of heat resistance wires 51 and 51 with a flow rate setting signal that has been previously stored in the memory, and then driving the piezo actuator 62 based on this differential signal.

A toroidal gap 43a is formed between the flow path regulating shaft body 43 and the inner circumferential surface of the flow rate regulating flow path 13c by regulating the position of the shaft body 40 in the axial direction of the bypass flow path 13. As a result, the three gaps 41b . . . on the upstream side, the aforementioned toroidal gap 43a, and the three gaps 42b . . . on the downstream side are in mutual communication so as to form a flow path for a fluid. Note that, as is shown in FIG. 2, the flow rate of the fluid flowing through the bypass flow path 13 of the main flow path 10 is increased by moving the position of the shaft body 40 relative to the axial direction of the bypass flow path 13 towards the upstream side, and is decreased by moving the position of the shaft body 40 relative to the axial direction of the bypass flow path 13 towards the downstream side. Specifically, by moving the position of the shaft body 40 relative to the axial direction of the bypass flow path 13 towards the upstream side, the size of the toroidal gap 43a is widened so that the flow rate of the fluid flowing through the connected flow paths is increased. In addition, by moving the position of the shaft body 40 relative to the axial direction of the bypass flow path 13 towards the downstream side, the size of the toroidal gap 43a is narrowed so that the flow rate of the fluid flowing through the connected flow paths is decreased.

If a structure such as the shaft body 40 and bypass flow path 13 is employed, then it becomes easier for the upstream-side shaft body 41 which has been inserted into the upstream-side flow path 13a to be axially offset towards the phase side between (i.e., towards an intermediate position between) the upstream-side contact positions, but more difficult for it to be axially offset towards the phase side of the upstream-side contact positions. On the other hand, it becomes easier for the downstream-side shaft body 42 which has been inserted into the downstream-side flow path 13b to be axially offset towards the phase side between (i.e., towards an intermediate position between) the downstream-side contact positions, but more difficult for it to be axially offset towards the phase side of the downstream-side contact positions. However, because the upstream-side contact positions and the downstream-side contact positions are mutually offset by 60 degrees (namely, by a phase equivalent to half of the above-described phase interval) from each other, the phases where it is easy for axial offset to occur and the phases where it is difficult for axial offset to occur are the opposite of each other on the upstream side and the downstream side, so that any axial runout is mutually corrected between the upstream side and the downstream side. As a result, axial runout of the shaft body 40 relative to the central axis of the bypass flow path 13 is suppressed.

Figure 5A:
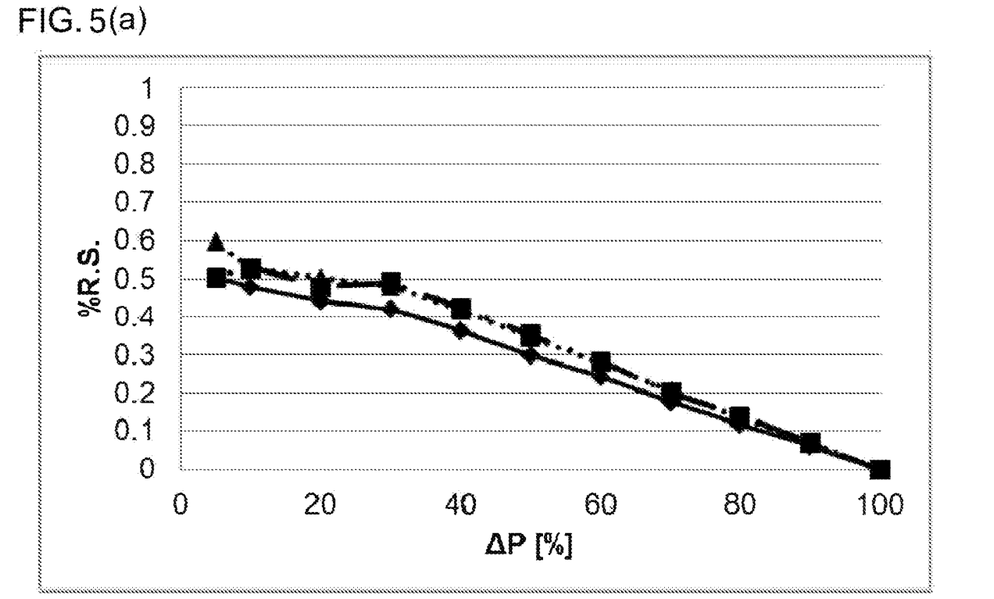
FIGS. 5(a) and 5(b) show graphs showing differential pressure flow rate characteristics obtained in an experiment performed using the shaft body according to the first embodiment and a comparative shaft body.
Figure 5B:
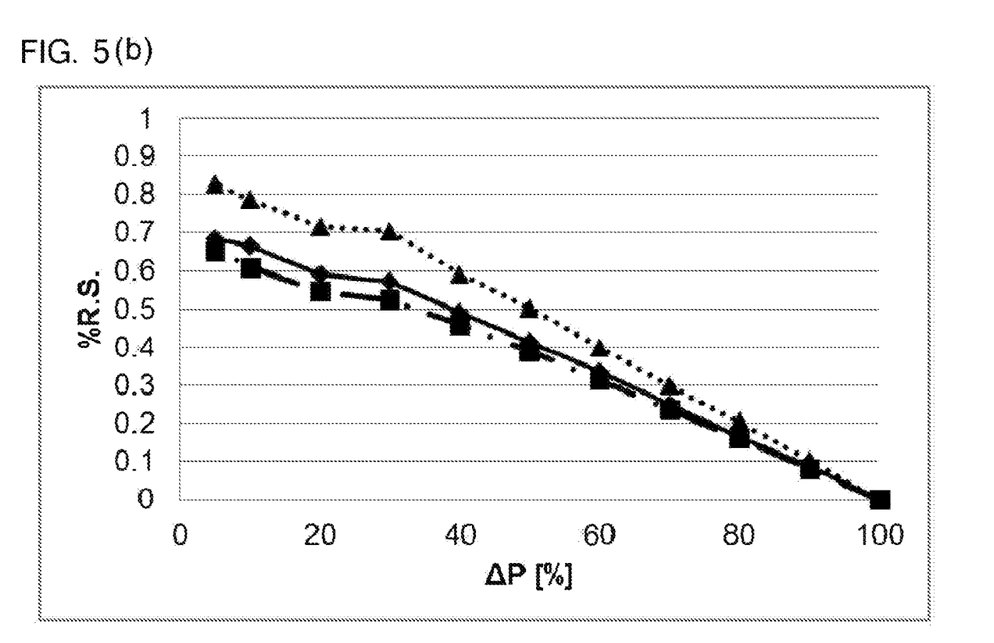

Three shaft bodies 40 of the present embodiment, as well as three same-phase shaft bodies in which there was no phase offset between the upstream-side contact positions and the downstream-side contact positions serving as comparison shaft bodies were then prepared as the shaft bodies to be inserted into the bypass flow path 13 of the flow rate control device 100. Six flow rate control devices having identical specifications other than the different shaft bodies were then produced, and tests were performed to measure the differential pressure flow rate characteristics in each of the flow rate control devices. The pressure in the splitting flow path located on the upstream side of the shaft body, and the pressure in the bypass flow path located on the downstream side of the shaft body were then measured using a pressure sensor in each of the flow rate control devices. When the differential pressures in each flow rate control device were the same pressure, the shaft bodies were fixed in the bypass flow paths so as to create flow paths in which fluids $N_2$ were flowing at the same flow rate. The results obtained when the differential pressure flow rate characteristics obtained from each of the six flow rate control devices were measured are shown in FIGS. 5(a) and 5(b). FIG. 5(a) is a graph showing differential pressure flow rate characteristics of the flow rate control devices in which the shaft body 40 of the present embodiment was used. FIG. 5(b) is a graph showing differential pressure flow rate characteristics of the flow rate control devices in which the comparison shaft body was used. In both graphs the horizontal axis shows the differential pressure ΔP (%) between the pressures measured in the two pressure sensors, while the vertical axis shows the flow rate linearity (% R. S.). The measurement results are shown using different symbols and line types (i.e., triangles, dotted line, diamonds, solid line, squares, and single-dot chain line) for each flow rate control device. When the two graphs were compared it was seen that, compared to the three flow rate control devices in which the comparison shaft body was used, there were markedly fewer irregularities in the respective straight lines for the three flow rate control devices in which the shaft body 40 of the present embodiment was used, and that an absolute value of the linearity at the point when the differential pressure of each straight line was 10% was improved by approximately 1% R. S.

Note that in the present embodiment, the flow rate control device 100 is formed by providing the flow rate control mechanism 60 in addition to the flow rate sensor 50, however, it is also possible to form a flow rate measuring device without providing the flow rate control mechanism 60 therein.

Additional Embodiments

Figure 6A:
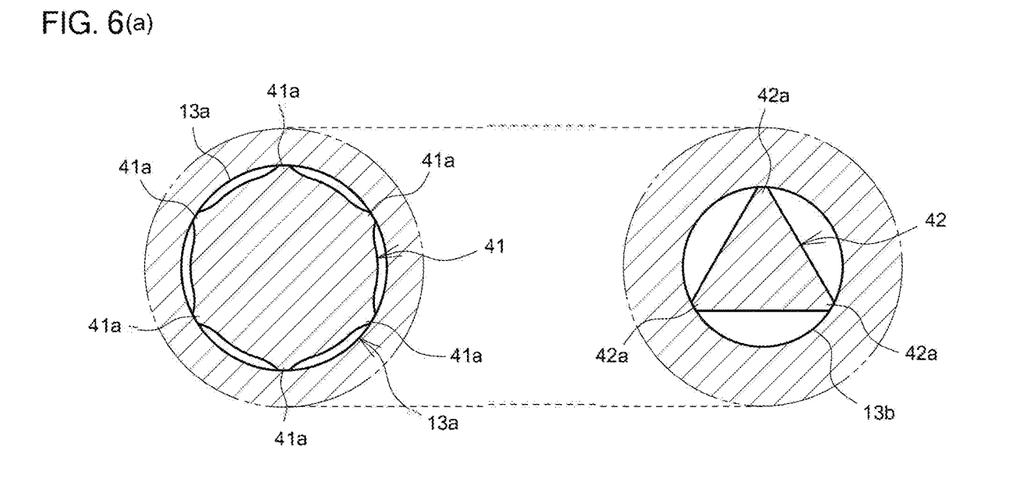
FIGS. 6(a) and 6(b) show cross-sectional views as seen from an axial direction showing states in which a shaft body according to another embodiment has been inserted into a bypass flow path.
Figure 6B:
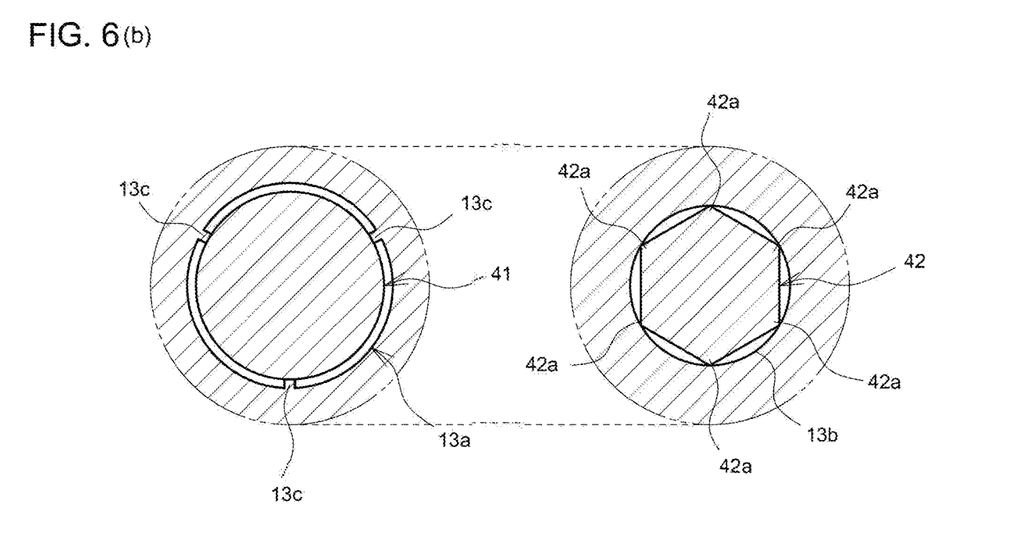
Figure 7:
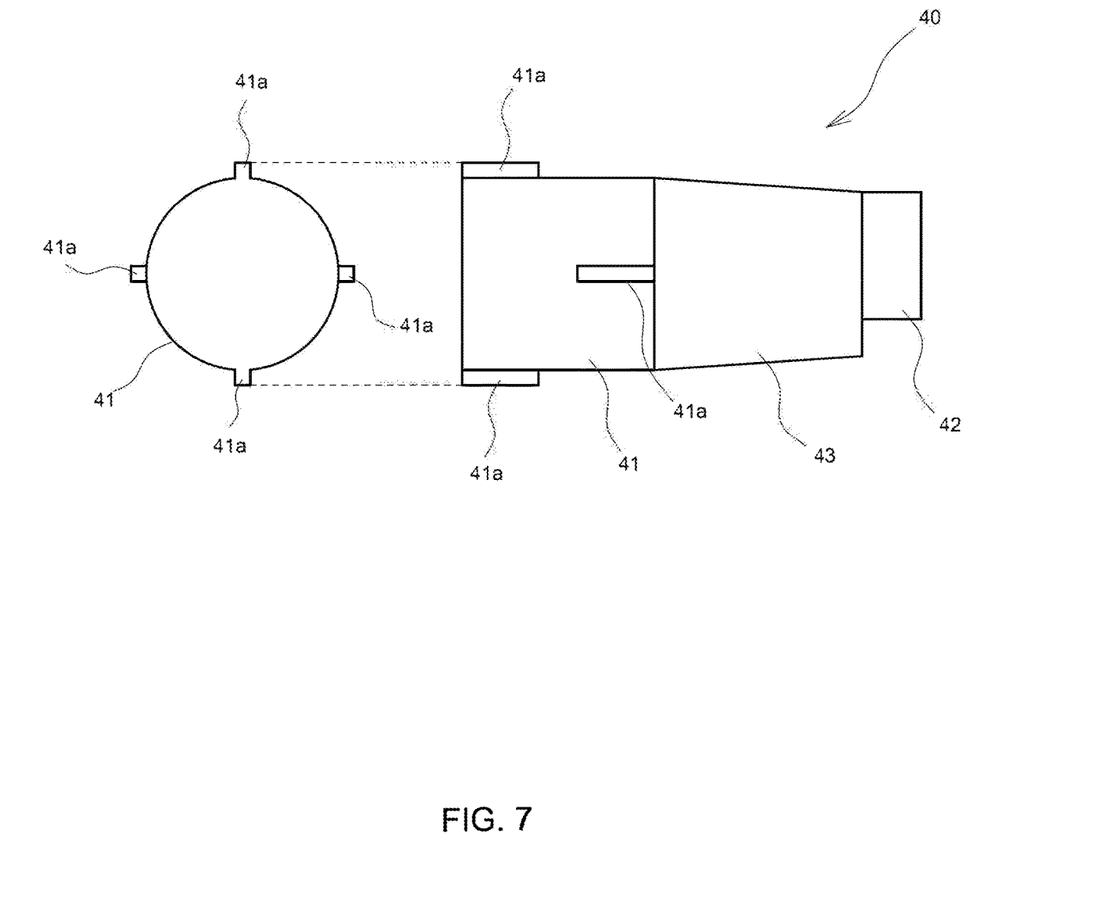
FIG. 7 is a side view showing a shaft body according to another embodiment.

FIGS. 6(a)-6(b) and FIG. 7 show additional embodiments. FIGS. 6(a) and 6(b) show cross-sectional views of the shaft body 40 as seen from the axial direction thereof. The views on the left side show a state in which the upstream-side shaft body 41 has been inserted into the upstream-side flow path 13*a*, while the views on the right side show a state in which the downstream-side shaft body 42 has been inserted into the downstream-side flow path 13*b*.

In the additional embodiment shown in FIG. 6(*a*), the upstream-side shaft body 41 is provided with six spacers 41*a* . . . at 60 degree intervals on the outer circumferential surface thereof, and the downstream-side shaft body 42 is formed in a triangular column shape. Furthermore, the upstream-side shaft body 41 is in contact with the inner circumferential surface of the upstream-side flow path 13*a* via the six spacers 41*a* . . . , and the downstream-side shaft body 42 is in contact with the inner circumferential surface of the downstream-side flow path 13*b* via the three corners 42*a* of the triangular column. As a result, the upstream-side shaft body 41 and the inner circumferential surface of the upstream-side flow path 13*a* are in contact at six phases, and the downstream-side shaft body 42 and the inner circumferential surface of the downstream-side flow path 13*b* are in contact at three phases, and the phases of the six contact positions on the upstream side coincide at 120 degree intervals with the phases of the three contact positions on the downstream side.

In the additional embodiment shown in FIG. 6(*b*), the upstream-side shaft body 41 is formed in a circular column shape, and the upstream-side flow path 13*a* is provided with three spacers 13*c* . . . at 120 degree intervals on the inner circumferential surface thereof. The downstream-side shaft body 42 is formed in a hexagonal column shape. Furthermore, the upstream-side shaft body 41 is in contact with the inner circumferential surface of the upstream-side flow path 13*a* via the three spacers 13*c* . . . , and the downstream-side shaft body 42 is in contact with the inner circumferential surface of the downstream-side flow path 13*b* via the six corners of the hexagonal column. As a result, the upstream-side shaft body 41 and the inner circumferential surface of the upstream-side flow path 13*a* are in contact at three phases, and the downstream-side shaft body 42 and the inner circumferential surface of the downstream-side flow path 13*b* are in contact at six phases, and the phases of the three contact positions on the upstream side coincide at 120 degree intervals with the phases of the six contact positions on the downstream side. Note that when the downstream-side shaft body 42 is formed in a polygonal column shape, the greater the number of corners, the smaller the cross-sectional area of the gaps 42*b* . . . between the downstream-side shaft body 42 and the downstream-side flow path 13*b*, and this enables drifting of the fluid flowing through the flow path to be prevented.

In the additional embodiment shown in FIG. 7, the upstream-side shaft body 41 is provided with four spacers 41*a* . . . at 90 degree intervals on the outer circumferential surface thereof, and the positions in the axial direction of the shaft body 40 of these four spacers 41*a* . . . are alternately offset towards the upstream side and towards the downstream side. In these additional embodiments as well, axial runout of the shaft body 40 relative to the bypass flow path 13 can be suppressed.

Note that in the same way as the downstream-side shaft body of the above-described embodiments, the upstream-side shaft body may be formed in a polygonal column shape, and in the same way as the upstream-side shaft body of the above-described embodiments, spacers may be provided on the outer circumferential surface of the downstream side shaft body.

Moreover, it is also possible for either one of or both of the upstream-side shaft body and the downstream-side shaft body to be formed in a column shape having a corner in each contact position, for example, in a column shape having a star-shaped cross-sectional configuration. In this case, the gaps between the shaft body and the inner circumferential surface of the flow path are not formed having arc-shaped cross-sectional configurations or bow-shaped cross-sectional configurations, as in the above-described embodiment, but instead have cross-sectional configurations that are determined by the shape of the shaft body and the shape of the inner circumferential surface of the flow path.

Moreover, in the above-described embodiments, the shaft and the flow path on both the upstream side and the downstream side are in contact at the same phase intervals, however, it is not absolutely essential that they be contact at the same phase intervals if they make contact intermittently at several different phase positions.

Moreover, in the above-described embodiments, the main body 30 is formed by a plurality of separate block bodies, however, the main body 30 may also be formed by a single block body. The fluid flowing along the flow path formed by the flow path forming structure of the present inventions not limited to being solely a gas, and may also be a mixture that contains a liquid or a powder or the like.

LIST OF REFERENCE CHARACTERS

100 . . . Flow rate control device
10 . . . Main flow path
13 . . . Bypass flow path
13*a* . . . Upstream-side flow path
13*b* . . . Downstream-side flow path
13*c* . . . Flow rate regulating flow path
20 . . . Flow path measuring flow path
30 . . . Main body
40 . . . Shaft body
41 . . . Upstream-side shaft body
42 . . . Downstream-side shaft body
43 . . . Flow path regulating shaft body
50 . . . Flow rate sensor
60 . . . Flow rate control valve

What is claimed is:

1. A flow path forming structure comprising:
a block body having a flow path along which a fluid passes;
a flow rate measuring flow path which branches from the flow path and rejoins to the flow path; and
a shaft body that is inserted into the flow path, wherein
the shaft body includes an upstream side shaft portion, a downstream side shaft portion, and a flow rate regulation shaft portion provided between the upstream side shaft portion and the downstream side shaft portion,
the upstream side shaft portion and an inner circumferential surface of the flow path are in contact with each other at an upstream side group of contact positions, the upstream side group of contact positions constituting all differently phased contact positions where the upstream side shaft portion is in contact with the inner circumferential surface,
the downstream side shaft portion and the inner circumferential surface of the flow path are in contact with each other at a downstream side group of contact positions, the downstream side group of contact positions constituting all differently phased contact positions where the shaft portion is in contact with the inner circumferential surface, the fluid flows through gaps formed between the shaft body and the inner circumferential surface of the flow path, the flow rate regulation shaft portion sets a flow rate of the fluid flowing through the flow path using a gap formed between an outer circumferential surface of the flow rate regulation shaft portion and the inner circumferential surface of the flow path, the contact positions of one of the upstream side group of contact positions and the downstream side group of contact positions are at different phases from all of the contact positions on the other one of the upstream side group of contact positions and the downstream side group of contact positions, and an inlet of the flow rate measuring flow path is on an upstream side of the flow rate regulation shaft portion in the flow path and an outlet of the flow rate measuring flow path is on a downstream side of the flow rate regulation shaft portion in the flow path.

2. The flow path forming structure according to claim 1, wherein the contact positions on either one of or on both of the upstream side shaft portion and the downstream side shaft portion are at the same phase intervals.

3. The flow path forming structure according to claim 1, wherein the number of contact positions on the upstream side shaft portion is the same as the number of contact positions on the downstream side shaft portion, and a phase interval of the contact positions on the upstream side shaft portion is the same as a phase interval of the contact positions on the downstream side shaft portion, and the phase of the contact positions on the upstream side shaft portion is offset from the phase of the contact positions on the downstream side shaft portion by one half of the phase interval.

4. The flow path forming structure according to claim 1, wherein either the upstream side shaft portion and the inner circumferential surface of the flow path, or the downstream side shaft portion and the inner circumferential surface of the flow path, or else both of the upstream side shaft portion and the inner circumferential surface of the flow path, and the downstream side shaft portion and the inner circumferential surface of the flow path are in contact with each other via spacers that are provided at contact positions either on the shaft body or on the inner circumferential surface of the flow path.

5. The flow path forming structure according to claim 1, wherein either one of or both of the upstream side shaft portion and the downstream side shaft portion is formed in a column shape having a corner in each contact position, and each of the corners is in contact with the inner circumferential surface of the flow path.

6. The flow path forming structure according to claim 5, wherein either one of or both of the upstream side shaft portion and the downstream side shaft portion is formed in an angular column shape.

7. A flow rate measuring device that is provided with the flow path forming structure according to claim 1.

8. A flow rate control device that is provided with the flow path forming structure according to claim 1, and that further comprises:

a flow rate control mechanism that is disposed on the flow path on the downstream side of a merging point where the flow path merges with the flow rate measuring flow path, and controls a flow rate of the fluid flowing through the flow path based on the flow rate measured by a flow rate sensor.

9. A flow path forming structure comprising:

a block body having a flow path along which a fluid passes;

a flow rate measuring flow path which branches from the flow path and rejoins to the flow path; and a shaft body that is inserted into the flow path, wherein the shaft body includes an upstream side shaft portion, a downstream side shaft portion, and a flow rate regulation shaft portion provided between the upstream side shaft portion and the downstream side shaft portion, the upstream side shaft portion and an inner circumferential surface of the flow path are in contact with each other at an upstream side group of contact positions, the downstream side shaft portion and the inner circumferential surface of the flow path are in contact with each other at a downstream side group of contact positions that are each distinct from the upstream side group of contact positions, wherein the downstream side group of contact positions includes all contact positions between the downstream side shaft portion and the inner circumferential surface, the fluid flows between the shaft body and the inner circumferential surface of the flow path, the flow rate regulation shaft portion sets a flow rate of the fluid flowing through the flow path using a first gap formed between an outer circumferential surface of the flow rate regulation shaft portion and the inner circumferential surface of the flow path, a plurality of the contact positions of one of the upstream side group of contact positions or the downstream side group of contact positions are at different phases from all of the contact positions of the other of the upstream side group of contact positions and the downstream side group of contact positions, and an inlet of the flow rate measuring flow path is on an upstream side of the flow rate regulation shaft portion in the flow path and an outlet of the flow rate measuring flow path is on a downstream side of the flow rate regulation shaft portion in the flow path, wherein the upstream side group of contact positions and the downstream side group of contact positions are separated in an axial direction of the shaft body by a second gap formed therebetween.

* * * * *